Patented Apr. 21, 1925.

1,534,931

UNITED STATES PATENT OFFICE.

HENRY V. DUNHAM, OF MOUNT VERNON, NEW YORK.

PROCESS OF MAKING CHEWING-GUM BASE.

No Drawing.   Application filed January 16, 1923.   Serial No. 613,044.

*To all whom it may concern:*

Be it known that I, HENRY V. DUNHAM, a citizen of the United States, residing at Mount Vernon, in the county of Westchester and State of New York, have invented new and useful Improvements in Processes of Making Chewing-Gum Base, of which the following is a specification.

In the manufacture of chewing gum and chewing gum bases, rubber gums of the class known as Jelutong, Pontianak, Almeidina and the like are frequently used as a substitute for chicle. A serious objection to the use of these rubber gums is the fact that they readily oxidize, crumble and acquire a bitter taste. Freshly prepared Pontianak of a good grade, containing approximately 18 to 20% of rubber constituent and 76% of resins, possess valuable masticatory properties but, as the material ages, its plastic character rapidly deteriorates with the formation of a friable, crumbly mass. Chewing gums made from Pontianak also tend to become friable and to acquire a disagreeable flavor on standing.

Numerous attempts have been made by various investigators to overcome these objections. One of the most nearly successful of the methods heretofore proposed consists in treating the rubber gums with an aqueous solution of an alkali whereby certain impurities supposed to be the cause of decay are removed. This treatment appears to be effective in reducing the rate of decay without, however, completely arresting it, as shown by the fact that chewing gums prepared from the washed material gradually disintegrate. Moreover, the alkali treatment and subsequent operations of washing and drying are tedious and expensive.

Other methods of treating the rubber gums to allow of their use in chewing gums have been proposed, but so far as I am aware they have not been employed successfully in commercial practice.

The present invention has for its object the treatment of rubber gums, such as Jelutong, Pontianak and the like by a process which is simple and inexpensive in operation. I have found that if the aforesaid rubbers be melted and suitably heated together with a fat, wax or oil, a uniform mixture is obtained which after cooling shows no tendency to become friable or to decompose with the production of a disagreeable flavor even after long storage, while furthermore, the masticatory properties of the gums are not impaired.

For this purpose a large number of fats, waxes and oils may be used, in fact any fat, wax or oil which is not objectionable from a hygienic standpoint, and does not impart an unpleasant taste to the product. As examples of suitable substances I may mention stearin, japan wax and hydrogenated peanut oil without, however, limiting myself to these particular substances.

To indicate the method of employing my process the following examples may be given.

Example I. 100 pounds of stearin are placed in a jacketed kettle provided with a suitable mixing device and heated by steam or other medium to about 120 to 130° C. 900 pounds of Pontianak are gradually added with efficient mixing, the aforesaid temperature being maintained and the stirring continued until a smooth uniform product is obtained. This operation is usually complete after about one hour. The mixture is then drawn off and carefully strained, when it is ready for use, or after straining it may be cooled in molds and stored.

Example II. 50 pounds of hydrogenated peanut oil (melting point 58° C.,) are melted and heated in a kettle or suitable receptacle at about 120° to 130° C.; 950 pounds of Pontianak are gradually added and the mixture heated and stirred for about one hour, after which the product is carefully strained and is then ready for use.

It is understood that other fats, vegetable waxes and fatty oils, or mixtures thereof can be used in the above examples and the proportion of these to the amount of rubber gums can be varied according to the nature of the rubber gum employed and the specific action of the different oleaginous materials.

In general I prefer to use for every pound of oleaginous material, i. e. fats, fatty oils and vegetable waxes, about 10 to 20 pounds of the rubber gums, or, where liquid fatty oils are used, from 20 to 40 pounds of the rubber gums, per pound of liquid fatty oil.

The temperature at which the mixing operation is performed may vary from about 115° C., or slightly above the melting point of the naturally soft gums, to 130° C., or higher for the tougher varieties.

The term "oleaginous material, which is a product of life processes," as used below, is intended to embrace fatty oils, hydrogenated fatty oils, fats, vegetable waxes and equivalent substances, (as distinguished from mineral oils, tar oils, paraffin wax etc., which are hydrocarbons) as well as mixtures of two or more of these substances. While hydrogenated fatty oils are not, in their finished state, products of life processes, the oils from which they are produced are products of life processes and the hydrogenated fatty oils are more analogous to natural hard fats than to mineral oils and tars, and to the usual products of refining the same.

I claim:

1. A process for preserving the masticatory properties of rubber gums high in resins by heating with about 5 to 10% of an oleaginous material, which is a product of life processes and not deleterious to health, at a temperature of about 115 to 130° C.

2. A process which comprises maintaining together in a molten state a low grade rubber material high in resinous matter with a minor fraction only of its weight of an oleaginous material which is a product of life processes, and mixing until substantially homogeneous, such operations being conducted at about 115 to 130° C.

In testimony whereof I have affixed my signature.

HENRY V. DUNHAM.